(12) United States Patent
Colwell

(10) Patent No.: US 8,438,867 B2
(45) Date of Patent: May 14, 2013

(54) PERSONAL OR SPOT AREA ENVIRONMENTAL MANAGEMENT SYSTEMS AND APPARATUSES

(76) Inventor: David Colwell, Ft. Myers, FL (US)

( * ) Notice: Subject to any disclaimer, the term of this patent is extended or adjusted under 35 U.S.C. 154(b) by 1588 days.

(21) Appl. No.: 11/467,468

(22) Filed: Aug. 25, 2006

(65) Prior Publication Data

US 2008/0047291 A1 Feb. 28, 2008

(51) Int. Cl.
*F28D 5/00* (2006.01)
(52) U.S. Cl.
USPC ............................................. 62/304; 62/310
(58) Field of Classification Search ............ 62/121, 62/171, 172, 176.1, 259.3, 259.4, 304, 306, 62/310; 261/24, 26, 28, 78.1, 115, 129, 131, 261/137; 236/44 A, 44 C, 44 R; 239/2.1, 239/54, 75, 98
See application file for complete search history.

(56) References Cited

U.S. PATENT DOCUMENTS

| | | | |
|---|---|---|---|
| 3,915,384 A * | 10/1975 | Diggs ........................... 239/272 |
| 4,065,252 A | 12/1977 | Hemsath et al. |
| 4,511,087 A | 4/1985 | Matsumoto |
| 4,688,724 A | 8/1987 | Pal et al. |
| 4,721,250 A | 1/1988 | Kennedy et al. |
| 4,839,106 A | 6/1989 | Steiner |
| 5,143,107 A | 9/1992 | Kelley |
| 5,348,227 A * | 9/1994 | Polonsky ........................ 239/63 |
| 5,598,719 A | 2/1997 | Jones et al. |
| 5,620,633 A | 4/1997 | Junkel et al. |
| 5,667,732 A | 9/1997 | Lederer |
| 5,692,682 A * | 12/1997 | Soule ............................ 239/403 |
| 5,724,824 A * | 3/1998 | Parsons .......................... 62/171 |
| 5,837,167 A | 11/1998 | Lederer |
| 5,843,344 A | 12/1998 | Junkel et al. |
| 5,967,415 A | 10/1999 | Utter |
| 6,065,689 A | 5/2000 | Kizer et al. |
| 6,151,907 A | 11/2000 | Hale |
| 6,161,771 A | 12/2000 | Henry |
| 6,257,502 B1 | 7/2001 | Hanish et al. |
| 6,272,874 B1 | 8/2001 | Keeney |
| 6,293,121 B1 | 9/2001 | Labrador |
| D457,613 S | 5/2002 | Schaefer |
| 6,406,006 B1 * | 6/2002 | Dettling et al. ............... 261/128 |
| 6,471,194 B2 | 10/2002 | Keeney |
| 6,543,247 B2 * | 4/2003 | Strauss ........................ 62/259.3 |
| 6,627,563 B1 * | 9/2003 | Huberty .......................... 442/91 |
| 6,637,729 B2 | 10/2003 | Gordon |
| 6,658,865 B2 * | 12/2003 | Schenk et al. .................... 62/64 |
| 6,786,701 B1 | 9/2004 | Huang et al. |
| 6,957,548 B1 | 10/2005 | Steinriede |

FOREIGN PATENT DOCUMENTS

GB 1285143 8/1972
JP 6109341 4/1994

* cited by examiner

*Primary Examiner* — Mohammad M Ali
(74) *Attorney, Agent, or Firm* — Holland & Hart LLP

(57) ABSTRACT

A personal or spot area environmental management system has a low pressure air supply in fluid communication with an air nozzle and a water supply in fluid communication with a water nozzle. The air nozzle and water nozzle are arranged that the water nozzle includes a vortex in the air stream from the air nozzle reducing the pressure. The low pressure facilitates drawing water from the water supply through the water nozzle. The water exiting the water nozzle has an average diameter of 60 microns or less, which facilitates complete evaporation and effectively produces a cool, dry air stream.

41 Claims, 3 Drawing Sheets

PERSONAL OR SPOT AREA ENVIRONMENTAL MANAGEMENT SYSTEMS AND APPARATUSES

STATEMENT REGARDING FEDERALLY SPONSORED RESEARCH

None

CROSS-REFERENCE TO RELATED APPLICATIONS

None

FIELD OF THE INVENTION

The present invention relates to evaporative cooling and, more particularly, to a low power personal environmental management systems and apparatuses.

BACKGROUND OF THE INVENTION

Evaporative cooling systems generally comprise introducing a water supply to an air source. The water is evaporated in the air, which lowers the air temperature. While directing an air stream over a water bath functions to provide some evaporative cooling, the arrangement requires a significant body of water and is relatively inefficient. Generally, a water stream is introduced into an air flow path. The water is evaporated which lowers the temperature of the air stream.

While conventional evaporative cooling systems function to lower temperature, they sometimes create high moisture content air. The high moisture content may be due to incomplete evaporation of the water supply introduced to the air stream. To counteract the high moisture content, some evaporative cooling systems inject the water stream into the air flow path using high pressure systems. Typically, the water stream is in the range of several hundred PSI. The high pressure source causes a spray with reduced droplet size, which decreases the residual moisture content of the cooled air stream.

While effective, the high pressure systems (or larger systems with air streams passing over a water bath) are uneconomical for spot area or personal applications. Thus, against this background, it would be desirable to develop a personal or spot area evaporative cooling system.

SUMMARY OF THE INVENTION

The present invention provides a personal or spot area environmental management system. The system comprises an air supply and water source. A mixer is in fluid communication with the air supply via a compressor and the water source. The mixer comprises an air nozzle, which is arranged such that the air expands upon exiting the nozzle creating a low pressure area, and a water nozzle, which is arranged to impinge on the exiting/expanding air stream to cause turbulence in the air stream further reducing the pressure. The low pressure air stream draws water facilitated by the low pressure from the water source. The water is atomized into droplets that evaporate in the air stream, which produces relatively dry, cool air.

The foregoing and other features, utilities and advantages of the invention will be apparent from the following more particular description of a preferred embodiment of the invention as illustrated in the accompanying drawings

BRIEF DESCRIPTION OF THE DRAWINGS

The accompanying drawings, which are incorporated in and constitute a part of this specification, illustrate embodiments of the present invention, and together with the description, serve to explain the principles thereof. Like items in the drawings are referred to using the same numerical reference

DETAILED DESCRIPTION

The technology of the present application will be explained with reference to the figures. While the personal or spot area environmental management system is explained with particular reference to certain devices and materials, it should be understood that those devices and materials are exemplary in nature and should not be construed as limiting. Moreover, while described as a personal or spot area environmental management system with specific regard for cooling, the principles describe herein are equally applicable to a low pressure fluid distribution system. Additionally, the technology of the present application may be used in both open and closed areas.

Figure 1:
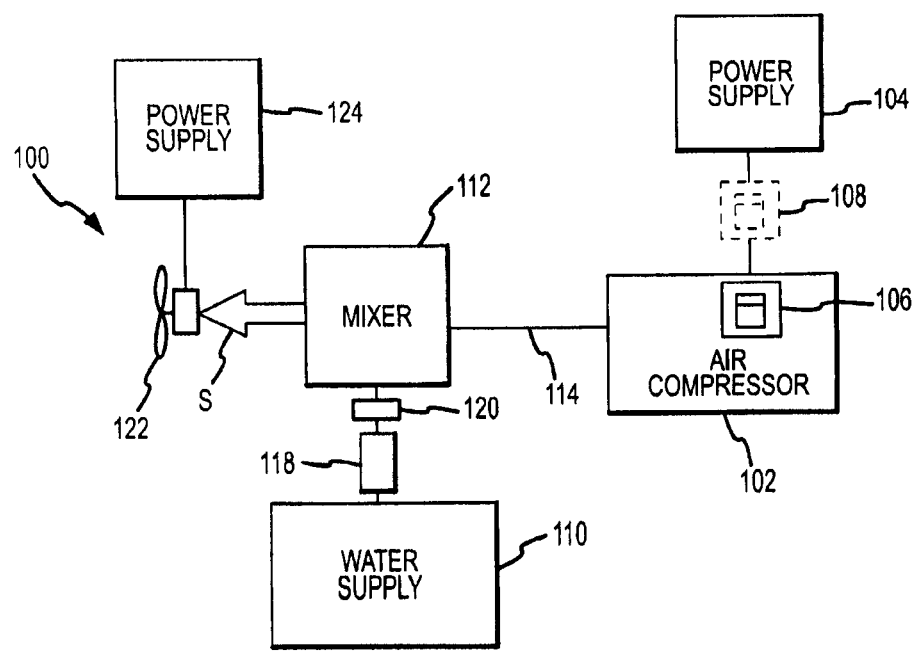
FIG. 1 is a functional block diagram of a personal or spot area environmental management system incorporating the technology of this application.

Referring first to FIG. 1, a personal or spot area environmental management system 100 is shown. System 100 includes a air compressor 102 connected to a power supply 104. Power supply 104 may be conventional line AC power source, a conventional battery or other DC power source, or the like as a matter of design choice. Moreover, power supply 104 may be other alternative supplies, such as fuel cells, solar cells, or the like. Note while described as an air compressor 102 (or pressurized air tank, see below) one of ordinary skill in the art would recognize on reading the disclosure that air should be construed broadly to include any gas. Air compressor 102 would typically have a power control switch 106. Power control switch 106 may be a simple on/off switch or a regulator to increase or decrease the output pressure of compressor 102. Instead of integral with air compressor 102, power control switch may be a remote switch 108 as shown in phantom. System 100 also includes a water reservoir or supply 110. Water supply 110 may be an open water supply, such as a bottle of water as shown, a pan or bucket of water, or a closed water supply, such as a tank or the like, or a municipality water supply, such as through a sink or garden hose connection, or other similar water supplies. A mixer 112 is in fluid communication with both air compressor 106 and water supply 110 via tubing 114 and 116, respectively. Tubing 114 and 116 could be identical flexible tubing, copper tubing, or PVC tubing as desired. Although low pressure, flexible tubing appears to be the most economical and portable. Mixer 112 outputs a relatively cool air stream S.

Figure 4:
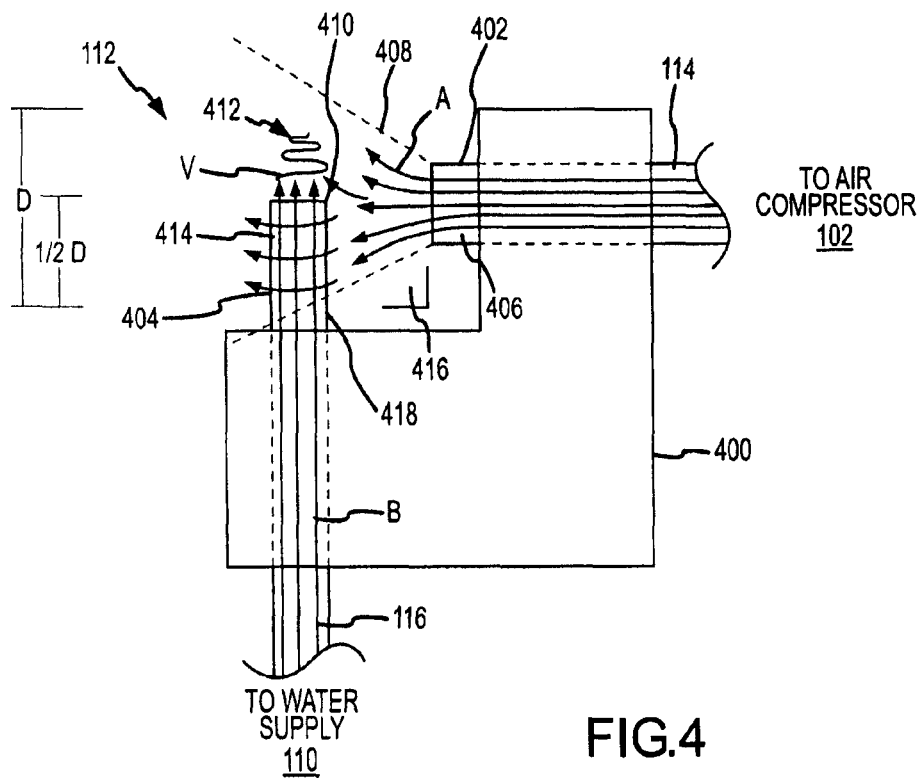
FIG. 4 is a functional block diagram of the mixer 112 shown in more detail.

Referring to FIG. 4, mixer 112 is shown in more detail. Mixer 112 is sometimes referred to as system 100's nozzle and includes a housing 400 to mount an air nozzle 402 and a water nozzle 404. Both air nozzle 402 and water nozzle 404 can be specifically designed, but terminating tubing 114 and 116 works satisfactory as well. An air stream 406 from air compressor 106 flows out air nozzle 402. Typically, air stream is at a pressure of 10 to 25 PSI, but could be higher (largely, the upper limit is based on cost and other portability considerations) or lower (down to about 5 PSI). On exiting tubing 114, the air stream expands as shown by arrows A. The expansion of the air stream effectively creates a low pressure area 408 in the area about nozzles 402 and 404. Water Nozzle 404 is place such that at least a lip 410 of nozzle 404 impinges on the expanding air stream A. This creates a turbulent area 412, similar to a wall jet. Moreover, air stream A passing around side 414 of nozzle 404 creates an air foil. The air flow creates a vortex V over nozzle 404, further reducing the pressure of low pressure area 408. The low pressure area 408 draws water from water supply 110 as shown by arrows B. Because water from water supply 110 is drawn by low pressure area 408, the water supply distance from and below the mixer 112 is determined in part by the low pressure area's ability to draw water.

While FIG. 4 shows nozzles 402 and 404 existing at a relative angle 416 to each other of about essentially 90°, angle 416 could be from about 45° to 90°. Good results should be achieved when angle 416 is between 60° and 85° and better results occur when the angle is limited to between 75° and 85°. Moreover, as shown, air stream A is shown as an expanding area with the first side 418 of nozzle 404 extending into air stream A. As shown, area 408 has a diameter of D and nozzle 404 extends about ½ D into air stream A. However, nozzle 404 does not need to extend into the air stream A to cause the turbulent effect as described above. Moreover, nozzle 404 can extend beyond the ½ way point. Although, the best results appeared to occur during testing when the nozzle 404 extended between about 0 the distance into air stream A to about ½ the distance into air stream A. The flow of air about nozzle 404 creates a vortex V or twister like flow over the nozzle facilitating drawing water from the water supply and atomizing the water.

Nozzle 402 and nozzle 404 generally are spaced apart from each other. The space between the nozzles depends on air pressure, air flow, and tubing size. For example, at pressures of 10 to 25 PSI, using an air flow of about 0.07 to about 0.09 cubic feet per minute, through 1/32 or less inch inner diameter tubing, nozzles 402 and 404 should be placed between about 0.0 and 0.125 inches from each other. Other configurations are of course possible. The average size of the water droplets, distribution, and flow rate may be modified by varying the relative angle, gap, and pressures.

Referring back to FIG. 1, optionally, a flow control valve 118 may be placed in the water supply tubing 116. Flow control valve 118 increases or decreases the water supply to nozzle 404. Decreasing the water flow correspondingly decreases the temperature reduction of the air stream A. Increasing the water flow correspondingly increases the temperature reduction of the air stream A. Flow control valve 118 could be any conventional regulator including, for example, a ball valve. Tubing 116 also may include a filter 120 to filter any particulate from the water stream.

While air flow S out mixer 112 provides localized cooling, optionally a distribution system 122 may be employed. Distribution system 122 may be any conventional fan (standing, reciprocating, ceiling, or the like) or blower. Distribution system 122 may receive power from power supply 104 or a separate power supply 124 as desired. Distribution system 122 facilitates using system 100 to manage the environment in a larger volume.

While only one mixer 112 is shown, multiple mixers 112 may be used in any personal or spot area environmental management system 100. For example, if a simple reciprocating fan is provided as a distribution system, three mixers 112 may be arranged about the fan. Preferably, the nozzle would be symmetrically placed about the fan.

Figure 2:
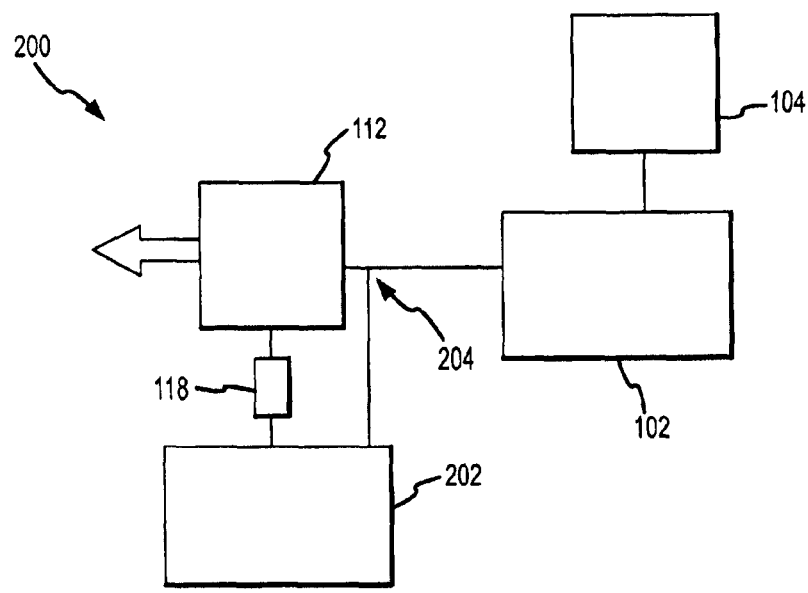
FIG. 2 is another functional block diagram of a personal or spot area environmental management system incorporating the technology of this application.

Referring now to FIG. 2, another personal or spot area environmental management system 200 is provided. System 200 is similar to system 100, but water supply 110 is replace with a closed, tank water supply 202. Closed, tank water supply 202 may be pressurized by using air from compressor 102. Air from compressor 102 is diverted from tube 114 via a connector 204 such that a portion of the air supply flows to tank 202, which pressurizes tank 202. Pressurizing tank 202 provides more water at nozzle 404 to be injected into air stream A. In this case, flow control valve 118 may be used to control both the decrease in air temperature, but also to inhibit over saturation. While compressor 102 is shown as pressuring tank 202, a separate compressor or high pressure gas supply could be provided.

Figure 3:
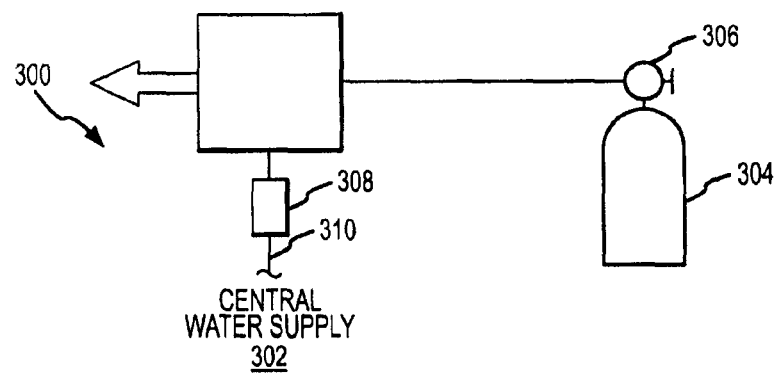
FIG. 3 is another functional block diagram of a personal or spot area environmental management system incorporating the technology of this application.

Referring now to FIG. 3, another personal or spot area environmental management system 300 is provided. System 300 is similar to systems 100 and 200, but is provide with a central water supply 302 (instead of an open water tank 110 or closed water tank 202) and a pressurized air supply 304 (such as a compressed air tank) with a regulator 306. Regulator 306 would be opened a sufficient amount to provided the desired air flow. A flow control or shut off valve 308 would be installed in the water supply tubing 310.

Figure 5:
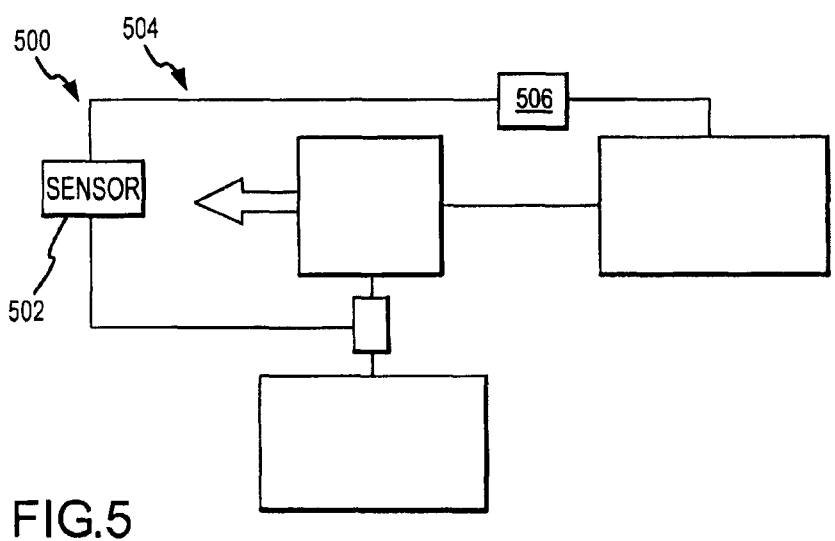
FIG. 5 is an optional automatic control system.

Referring now to FIG. 5, another personal or spot area environmental management system 500 is provided. System 500 is similar to systems 100, 200, and 300 described above, but includes a sensor 502 to measure an indicator in area 504 effected by system 500. Sensor 502 may be, for example, a temperature sensor, a humidity sensor, or the like. Sensor 502 is connected to flow control valve 504, which would be a conventional solenoid valve. The flow of liquid allowed by flow control valve 504 would be controllable by the indicator sensed by sensor 502. For example, if temperatures in area 504 exceed 90°, flow control valve 504 may be fully opened and if temperatures in area 504 fall below 75°, flow control valve 504 may be fully closed with various stages of open between 68 and 90 degrees. The temperatures provided herein are exemplary and non-limiting. Of course the settings are largely a matter of design choice. Sensor 502 may provide input to a controller 506 that controls the air compressor 106 or regulator 306 as well. Controller 506 may increase or decrease the compressor operation, provide air flow regulation, or cycle the device on and off to regulate temperature.

While the invention has been particularly shown and described with reference to embodiments thereof, it will be understood by those skilled in the art that various other changes in the form and details may be made without departing from the spirit and scope of the invention.

The invention claimed is:

1. A personal or spot area environmental management system, comprising:
   a low pressure air supply;
   a water supply; and
   a mixer;
   the mixer comprising a nozzle housing including an air nozzle in fluid communication with the low pressure air supply and a water nozzle in fluid communication with the water supply, the air nozzle providing an expanding air flow stream, the water nozzle arranged such that at least a lip of the water nozzle impinges the expanding air flow stream to create turbulence, wherein a low pressure area resides above the water nozzle to facilitate drawing water to the low pressure area from the water supply, wherein a temperature of the air flow stream decreases.

2. The system of claim 1, wherein the low pressure air supply comprises an air compressor connected to a power supply.

3. The system of claim 2, wherein the power supply comprises batteries.

4. The system of claim 1, further comprising a distribution system.

5. The system of claim 4, wherein the distribution system comprises a fan.

6. The system of claim 4, further comprising a fan in fluid communication with the mixer to distribute the decreased temperature air stream.

7. The system of claim 1, wherein the air nozzle and water nozzle are arranged at a relative angle to each other of about 45 degrees to about 90degrees.

8. The system of claim 7, wherein the relative angle is about 60 degrees to about 90 degrees.

9. The system of claim 7, wherein the relative angle is about 75 degrees to about 85 degrees.

10. The system of claim 1, wherein the water flow nozzle extends into the air flow stream about ½ way.

11. The system of claim 1, wherein the water nozzle extends into the air flow stream more than ¼ way.

12. The system of claim 1, wherein the water nozzle extends into the air flow stream less than about ¾ way.

13. The system of claim 1, wherein the water nozzle extends into the air flow stream between ⅓ way to ⅔ way.

14. The system of claim 1, wherein the water nozzle extends into the air flow stream less than ½ way.

15. The system of claim 1, wherein the low pressure air supply comprises a high pressure air source and a regulator.

16. The system of claim 1, wherein the low pressure air supply is less than 50 PSI.

17. The system of claim 16, wherein the low pressure air supply is between about 5 PSI and 25 PSI.

18. The system of claim 16, wherein the low pressure air supply is greater than about 5 PSI.

19. The system of claim 1, wherein the water supply is pressurized.

20. The system of claim 19, wherein the water supply is pressurized using the low pressure air supply.

21. The system of claim 1, further comprising a flow control valve between the water supply and the water nozzle to control the volume of water supplied.

22. The system of claim 21, wherein the flow control valve is a manual valve.

23. The system of claim 21, wherein the flow control valve is a solenoid valve.

24. The system of claim 23, further comprising an environmental sensor connected to the solenoid valve to control flow based on the sensed environment.

25. The system of claim 24, wherein the environmental sensor senses temperature.

26. The system of claim 24, wherein the environmental sensor senses humidity.

27. The system of claim 1, further comprising a controller to regulate the air supply.

28. The system of claim 27, further comprising an environmental sensor connected to the controller wherein the air supply is regulated by the sensed environment.

29. The system of claim 1, wherein the water drawn into the air stream forms droplets having an average diameter of 60 micons or less.

30. A personal or spot area environmental management system comprising:

a fluid distribution device;

at least one air nozzle in fluid communication with a low pressure air supply mounted on the fluid distribution device to direct an air stream into the fluid distribution system;

at least one corresponding water nozzle in fluid communication with a water supply mounted on the fluid distribution device having a lip that impinges on the air stream wherein the at least one nozzle and the at least one corresponding water nozzle are arranged at a relative angle to each other that causes a low pressure area that facilitates drawing water from the water supply through the at least one water nozzle and into the air stream.

31. The system of claim 30, wherein the at least one air nozzle comprises a plurality of air nozzles and the at least one corresponding water nozzle comprises a plurality of corresponding water nozzles.

32. The system of claim 31, wherein the plurality of air nozzles and the plurality of corresponding water nozzles are arrayed symmetrically about the fluid distribution device.

33. The system of claim 30, wherein the fluid distribution system is a blower.

34. The system of claim 30, wherein the fluid distribution system is a fan.

35. The system of claim 34, wherein the fan is a portable fan.

36. The system of claim 30, wherein the low pressure air supply is between about 5 PSI and 25 PSI.

37. The system of claim 30, wherein the relative angle between the at least one air nozzle and the at least one corresponding water nozzle is between about 60 degrees and 90 degrees.

38. The system of claim 30, wherein the water drawn into the air system has an average droplet size of 60 microns or less.

39. A fluid distribution device, comprising;

a mixer;

a low pressure air supply; and a water supply, such that the mixer is in fluid communication with the low pressure air supply to produce a low pressure air stream in the mixer;

the mixer in fluid communication with the water supply and comprising means for producing a vortex in the low pressure air stream to facilitate drawing water from the water supply into the low pressure air stream.

40. The device of claim 39, wherein the means for producing the vortex comprises a water nozzle imposing on the low pressure air.

41. A spot area environmental management system comprising:

A. a fan;

B. a plurality of air nozzles mounted about the fan, the air nozzles being in fluid communication with a low pressure air supply to direct a plurality of associated air streams into the fan;

C. a plurality of water nozzles each corresponding to one of the air nozzles, the water nozzles being in fluid communication with a water supply and having a lip that impinges on its associated air stream thereby causing a low pressure area that facilitates drawing water from the water supply through the water nozzle and into the air stream, the water supply being pressurized by the low pressure air supply;

D. a controller operative to regulate the air supply; and
E. an environmental sensor operable to provide feedback to the controller wherein the air supply is regulated in relation to the feedback.

\* \* \* \* \*